(12) United States Patent
Sato et al.

(10) Patent No.: US 6,325,724 B1
(45) Date of Patent: Dec. 4, 2001

(54) UNIVERSAL JOINT ASSEMBLY FOR COUPLING TOGETHER A FIRST AND A SECOND SHAFT

(75) Inventors: Kenji Sato; Sakae Matsumoto; Tetsuya Koike, all of Maebashi (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/348,275

(22) Filed: Jul. 7, 1999

(30) Foreign Application Priority Data

Jul. 16, 1998 (JP) .................................................. 10-216548

(51) Int. Cl.[7] ......................................................... F16D 3/50
(52) U.S. Cl. ............................................. 464/119; 464/114
(58) Field of Search ................................... 464/113, 114, 464/119, 905; 74/492

(56) References Cited

U.S. PATENT DOCUMENTS

| 636,758 | * | 11/1899 | Casaday ............................... 464/114 |
| 3,501,928 | | 3/1970 | Pitner . |
| 4,272,972 | * | 6/1981 | James .................................... 464/119 |
| 4,579,546 | | 4/1986 | Pastor . |
| 4,964,840 | | 10/1990 | Kapaan . |
| 4,983,143 | * | 1/1991 | Sekine et al. ........................ 74/492 X |
| 5,551,919 | | 9/1996 | Cherpician . |
| 5,766,081 | | 6/1998 | Desmarais . |

FOREIGN PATENT DOCUMENTS

| 42-219 | * | 2/1888 | (DE) ..................................... 464/119 |
| 4211587 A1 | | 10/1993 | (DE) . |
| 48-23204 | | 7/1973 | (JP) . |
| 35-24577 | | 2/1980 | (JP) . |
| 57-79227 | | 5/1982 | (JP) . |
| 1-169123 | | 7/1989 | (JP) . |
| 2-306876 | * | 12/1990 | (JP) ........................................ 74/492 |
| 4-48339 | | 11/1992 | (JP) . |
| 7-33851 | | 4/1995 | (JP) . |

* cited by examiner

*Primary Examiner*—Lynne H. Browne
*Assistant Examiner*—Greg Binda (57) ABSTRACT

The universal joint of this invention comprises a hub interposed between an upper shaft and a middle shaft, an upper pin coupling together the upper shaft and the hub, a lower pin coupling together the middle shaft and the hub, and a stopper ring fitting over the outside of the middle shaft at an end thereof on the side of the upper shaft. The hub is formed in such a manner that the outer shape thereof is a spindle shape narrowing in the fore-and-aft direction with respect to the upper pin, and a bottomed hole provided with a taper portion is formed in the axial center thereof, opening towards the rear of the upper pin. In a front end portion of the upper shaft are formed a taper portion contracting towards the front of the upper pin and a groove portion engaging with the lower pin. The upper and lower pins are disposed adjacent to one another in the central axial direction of the hub and are also at a phase angle difference of, for example, 90 degrees. This invention provides a universal joint that has a simpler structure and a reduced manufacturing cost.

14 Claims, 12 Drawing Sheets

UNIVERSAL JOINT ASSEMBLY FOR COUPLING TOGETHER A FIRST AND A SECOND SHAFT

BACKGROUND OF THE INVENTION

The present invention relates to a universal joint used in the steering apparatus or the like of an automobile, and, more particularly, to a technique designed to simplify the structure and reduce the manufacturing cost thereof.

The steering apparatus of an automobile or the like comprises a steering wheel that provides the driver with the steering operations, a steering gear that steers the vehicle's wheels, and a steering shaft that provides a linkage between the steering wheel and the steering gear. With the steering apparatus for an automobile, it is common to use a plurality of shafts coupled together axially by universal joints, because there is limited chance for locating the steering gear on the central axial line of the steering wheel.

A Cardan joint in which a crosspiece (cross-shaped axes) is inserted in a freely oscillatory manner between a pair of joint yokes is generally used as a universal joint for a steering shaft, as disclosed in U.S. Pat. No. 3,501,928. In this Cardan joint, end portions of steering shafts are connected to the free ends of the two joint yokes, and needle bearings are disposed between the crosspiece and the joint yokes. U.S. Pat. No. 4,579,546 discloses a universal joint in which a hub is interposed between each joint shaft and the joint yoke, and these components are connected together by one long pin and two short pins. Otherwise, Japanese Utility Model Publication(KOKOKU) No. 4-48339 discloses a universal joint that uses a spherical joint member and Japanese Patent Laid-Open Application(KOKAI)No. 1-169123 discloses a universal joint that uses an annular joint element.

Universal joints of the prior art have a problem in that it is difficult to reduce the manufacturing costs thereof, or to apply them to mass-production. For example, the previously mentioned Cardan joint requires a crosspiece and four needle bearings in addition to the pair of joint yokes, which are subjected to machining after being forged (or cast), so it is inevitable that a larger number of components and a larger number of assembly steps are required. In addition, the shapes of the joint shafts and joint yokes in the universal joint disclosed in U.S. Pat. No. 4,579,546 are extremely complicated, so that a larger number of steps and a longer time is required for machining and other processing, thus leading to an increase in manufacturing cost and a decrease in productivity. The other universal joints are similarly undesirable for various reasons, such as the complicated shapes of the spherical joint member or joint yoke, or a larger number of components.

The present invention was devised in the light of the above situation and has the objective of providing a universal joint that has a simpler structure and a reduced manufacturing cost.

SUMMARY OF THE INVENTION

The present invention was designed to solve the above described problems in the art and relates to a universal joint that links together a first shaft and a second shaft in a freely oscillatory manner relative to one another, wherein the universal joint is provided with a hub into which or onto which are fitted the first shaft and the second shaft in such a manner that these shafts are free to oscillate mutually in respective predetermined directions; a first pin coupling together the first shaft and the hub at the center of oscillation of the first shaft; and a second pin coupling together the hub and the second shaft at the center of oscillation of the second shaft, at a predetermined offset with respect to the first pin in the axial direction of the hub and also maintaining a phase angle difference of approximately 90 degrees with the first pin.

With this invention, if a first solid shaft is inserted into the hub and these two components are coupled together by the first pin then the hub is inserted into a second hollow shaft and these two components are coupled together by the second pin, by way of example, the first shaft and the second shaft are coupled together in a freely oscillatory manner, with the first pin and the second pin acting as oscillatory axes, and are capable of rotational transmission in a state in which a predetermined joint angle is applied thereto.

DETAILED DESCRIPTION OF THE PREFERRED EMBODIMENTS

The universal joint of the present invention will be described below, based on several embodiments thereof and with reference to the accompanying drawings.

Figure 1:
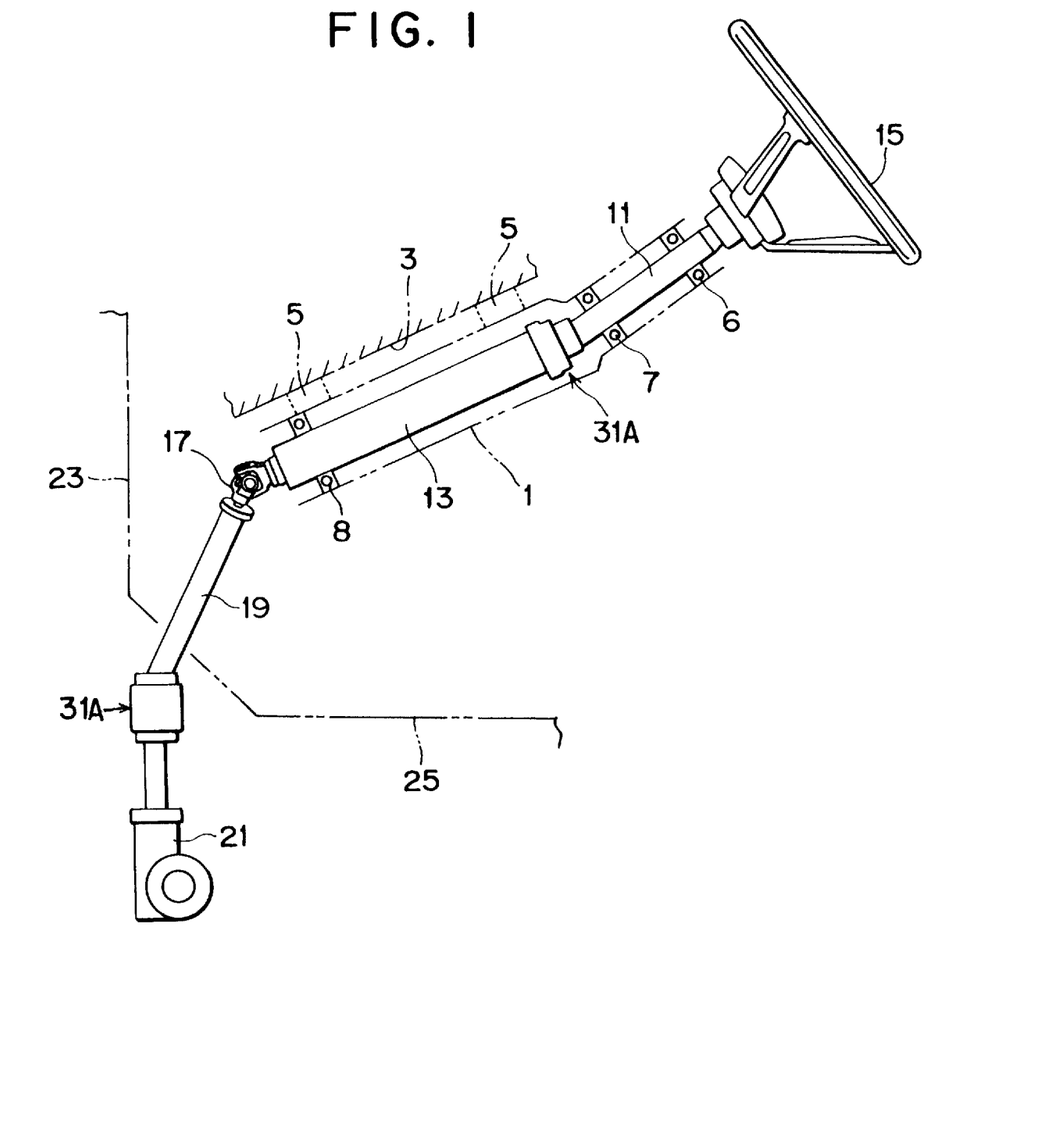
FIG. 1 is a schematic perspective side view of portions within an automobile room side of a steering apparatus to which the universal joint of the present invention is applied.

A schematic perspective side view of a steering apparatus for an automobile, which is a first embodiment of this invention, is shown in FIG. 1, wherein reference number 1 denotes a shock-absorbing steering column 1. The steering column 1 is fixed by capsules 5 or the like to a bracket 3 on the automobile body side, and an upper steering shaft (hereinafter called an "upper shaft") 11 that is a first shaft and a middle steering shaft (hereinafter called a "middle shaft") 13 that is a second shaft are supported in a freely rotatable manner by three radial bearings 6,7 and 8. A steering wheel 15 is attached to an upper end of the upper shaft 11 and a lower steering shaft 19 is connected by a Cardan joint 17 to a lower end of the middle shaft 13.

The steering column 1 incorporates a mechanism called a gooseneck tilt mechanism, whereby a predetermined joint angle can be formed between the upper shaft 11 and the middle shaft 13 by the operation of a tilt lever (not shown in the figure). In this figure, reference number 21 denotes a steering gear connected to a lower end of the lower steering shaft 19 and reference number 23 denotes a dashboard that forms a surface of the automobile body together with a floor panel 25.

Figure 2:
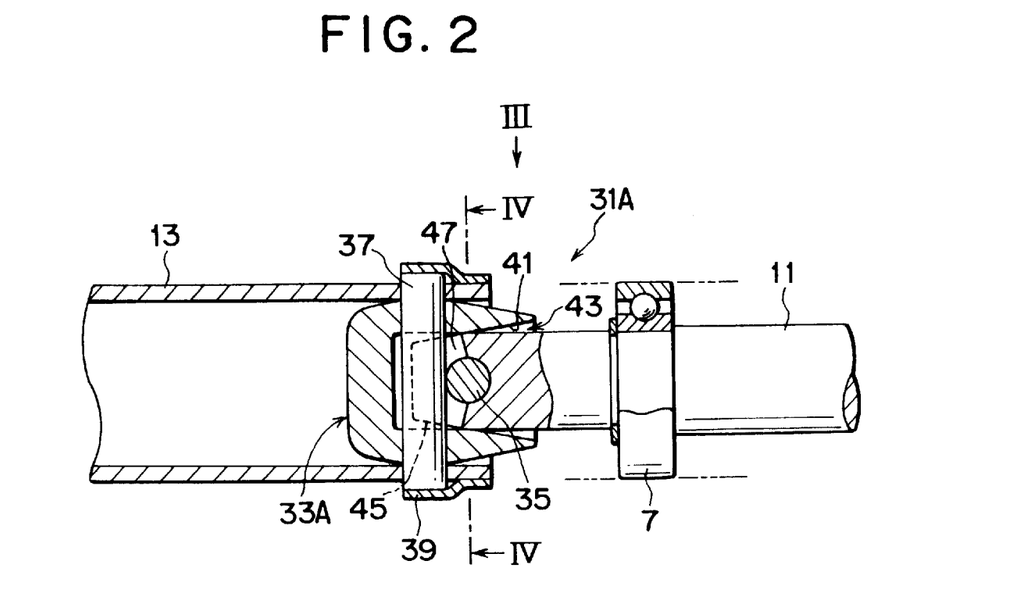
FIG. 2 is a lengthwise section through the universal joint of this first embodiment of the invention.
Figure 3:
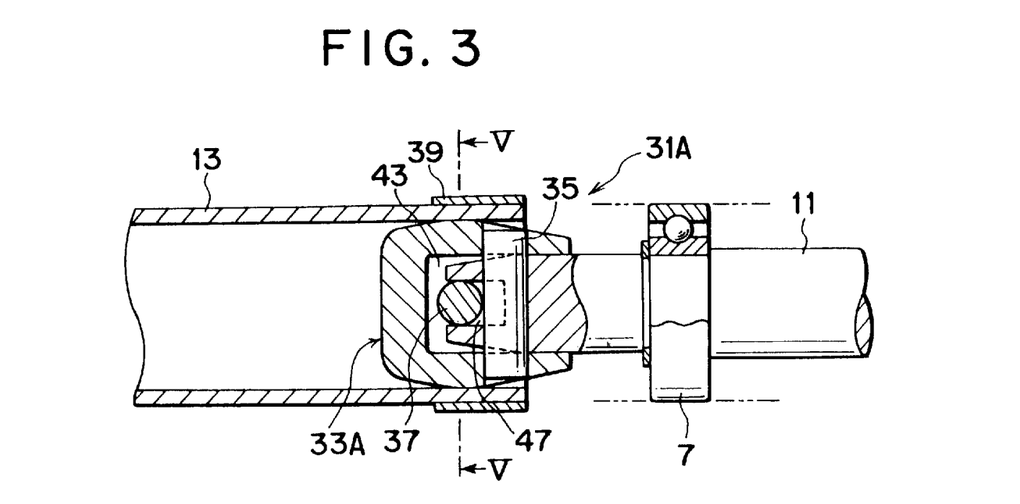
FIG. 3 is a view in the direction of the arrow III in FIG. 2.
Figure 4:
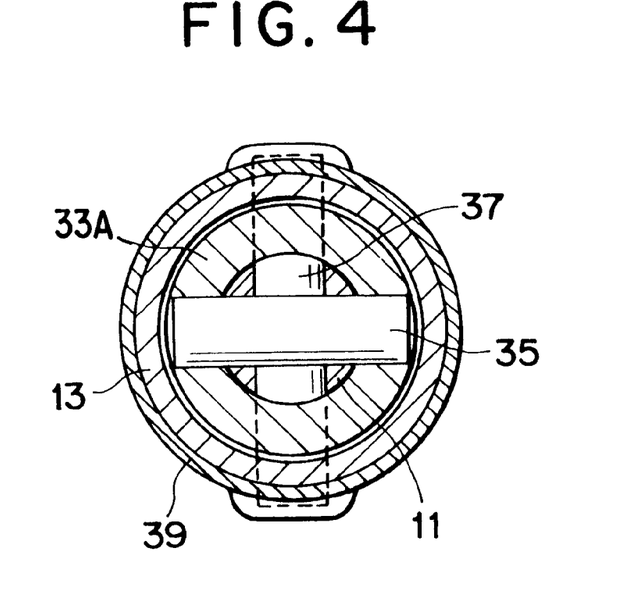
FIG. 4 is a lateral section taken along the line IV—IV in FIG. 2.
Figure 5:
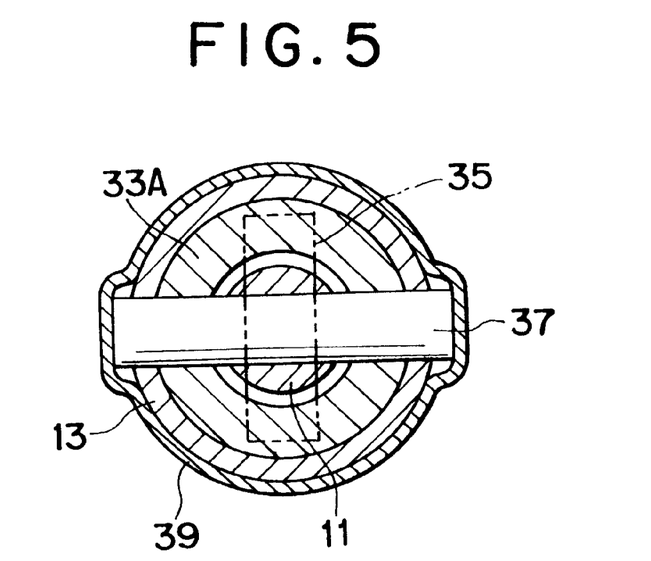
FIG. 5 is a lateral section taken along the line V—V in FIG. 3.

With this first embodiment of the invention, a universal joint 31A of the first embodiment is formed in a coupling portion between the upper shaft 11 and the middle shaft 13. As shown in FIG. 2, FIG. 3 (which is a view in the direction of the arrow III in FIG. 2), FIG. 4 (which is a lateral section taken along the line IV—IV of FIG. 2), and FIG. 5 (which is a lateral section taken along the line V—V of FIG. 3), this universal joint 31A comprises a hub 33A interposed between the solid upper shaft (the first shaft) 11 and the hollow middle shaft (the second shaft) 13; an upper pin (first pin) 35 coupling the upper shaft 11 and the hub 33A; a lower pin (second pin) 37 coupling the middle shaft 13 and the hub 33A; and a stopper ring 39 which fits over the outer side of an end portion of the middle shaft 13, to prevent the lower pin 37 from falling out.

The outer surface of the hub 33A is shaped by machining, forging, casting, or injection molding into a spindle shape that narrows in the fore-and-aft direction with respect to the lower pin 37 (the lateral direction in FIGS. 2 and 3), and a bottomed socket 43 provided with a taper portion 41 opening towards the rear of the upper pin 35 is formed in the axial center thereof. A front end portion of the upper shaft 11 is strengthened by a thermal processing and also a taper portion 45 is also formed therein, contracting towards the front of the upper pin 35, and a groove 47 that engages with the lower pin 37 is formed therein. The upper pin 35 and the lower pin 37 are disposed adjacent to one another in the central axial direction of the hub 33A and are also at a phase angle difference of, for example, 90 degrees. The upper pin 35 is pressed into the upper shaft 11 and the lower pin 37 is pressed into the hub 33A.

The operation of this first embodiment is described below.

Figure 6:
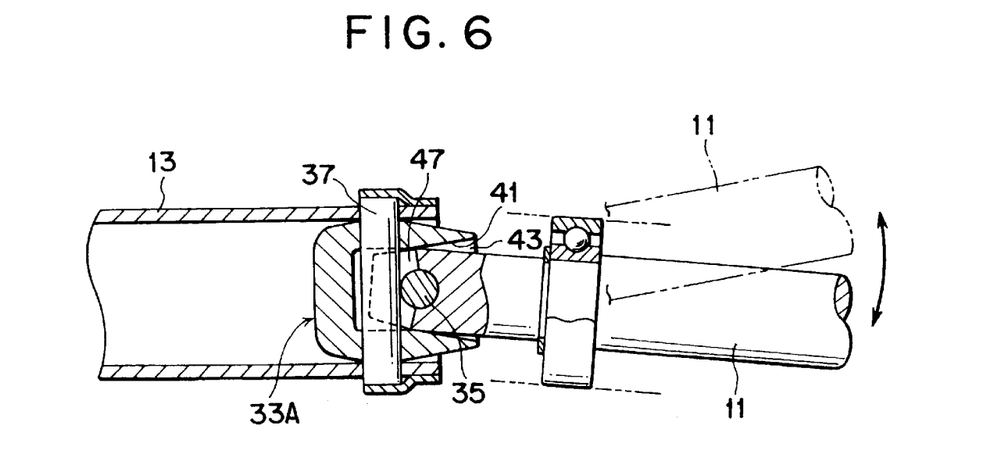
FIG. 6 is an illustrative view of the operation of the first embodiment shown in FIG. 2.
Figure 7:
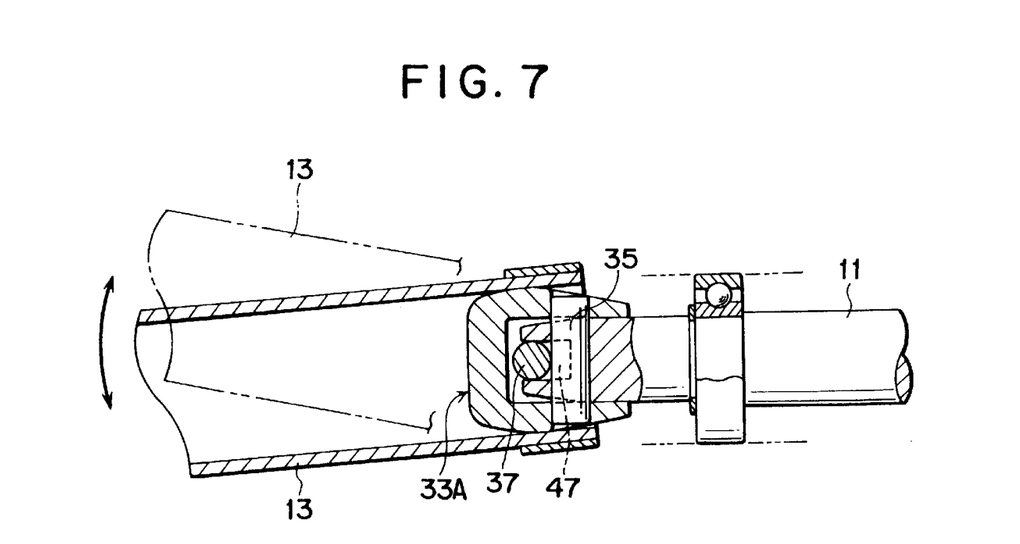
FIG. 7 is another illustrative view of the operation of this first embodiment.

In the first embodiment of the invention, the upper shaft 11 and the middle shaft 13 oscillate relative to one another about the oscillatory center of the upper pin 35, within a range controlled by the taper portion 41 of the bottomed socket 43 and the taper portion 45 of the upper shaft 11, as shown in FIG. 6. In addition, the upper shaft 11 and the middle shaft 13 oscillate relative to one another about the oscillatory center of the lower pin 37 that is positioned at a phase angle difference of 90 degrees with respect to the upper pin 35, within a range controlled by the spindle shape of the hub 33A, as shown in FIG. 7. This ensures that the rotational force of the upper shaft 11 is transmitted to the middle shaft 13 within a comparatively small region of joint angle, while unevenness in velocity is restrained to a degree at which it can be ignored. This embodiment of the invention also has the groove 47 that engages with the lower pin 37 formed in the upper shaft 11, so that a comparatively large torque can be transmitted between the upper shaft 11 and the middle shaft 13. In addition, the stopper ring 39 fits over the outside of the end portion of the middle shaft 13, so that there is no danger of the lower pin 37 falling out of the hub 33A, even if the engagement with the lower pin 37 should loosen for some reason.

In this manner, the universal joint 31 of this first embodiment removes the need for a joint yoke that requires complicated machining and expensive needle bearings, by subjecting the upper shaft 11 and the middle shaft 13 to a simple boring process, which greatly reduces the number of components and the number of assembly steps, and which also enables a lower cost and improved mass-productivity. Furthermore, since the arrangement of the universal joint 31A of the present invention does not prevent uneven velocities in the rotational transmission, making it unsuitable for places where a large joint angle is required, the fifth embodiment of this invention, which will be described later, is used in the coupling portion between the lower steering shaft 19 and the steering gear 21 of the steering apparatus shown in FIG. 1.

Figure 8:
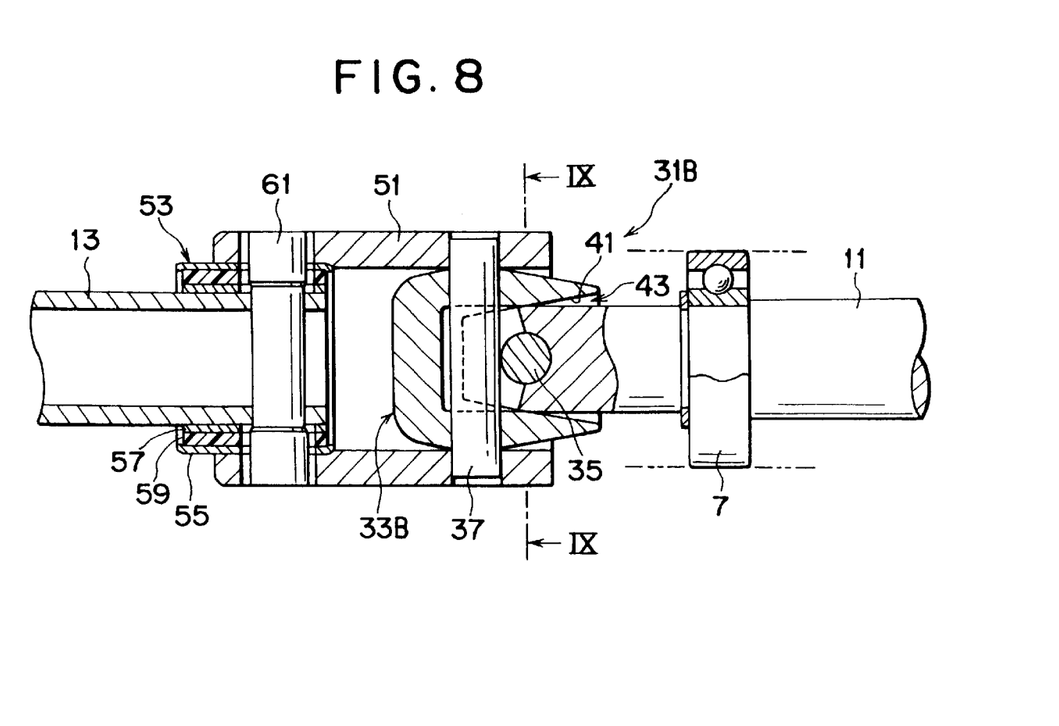
FIG. 8 is a lengthwise section through the universal joint of a second embodiment of the invention.
Figure 9:
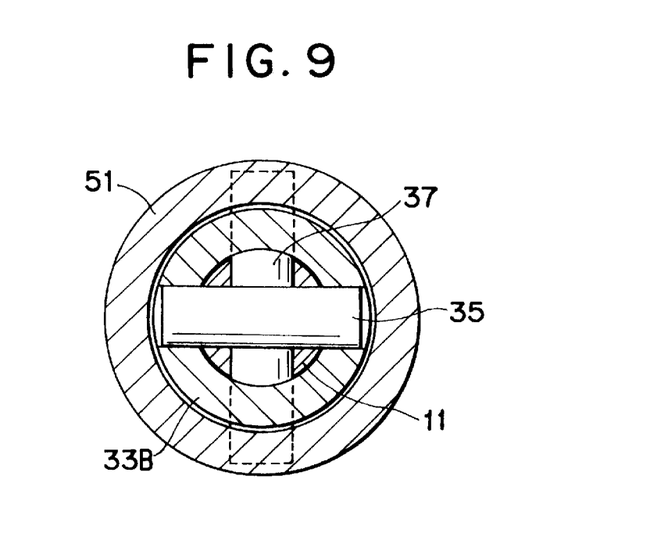
FIG. 9 is a lateral section taken along the line IX—IX in FIG. 8.

A second embodiment of this invention is shown in FIG. 8 and FIG. 9 (which is a lateral section taken along the line IX—IX of FIG. 8). The description of this second embodiment focuses on points where it differs from the first embodiment, so further description of common portions is omitted.

In the universal joint 31B of this second embodiment shown in FIGS. 8 and 9, a circular cylindrical joint yoke 51 is attached to a rear end portion of the middle shaft 13, and a shock-absorbing ring 53 is pressed in between the middle shaft 13 and the joint yoke 51. The shock-absorbing ring 53 has a composite rubber ring 59 inserted between an outer tube 55 and an inner tube 57, made of steel tubing, so that any relative displacement between the middle shaft 13 and the joint yoke 51 is absorbed by the resilient deformation of the composite rubber ring 59. In FIG. 8, the member denoted by reference number 61 is a stopper pin that fits into the middle shaft 13 to control the relative displacement between the middle shaft 13 and the joint yoke 51. The joint yoke 51 and the hub 33B of this second embodiment of the invention are coupled by the lower pin 37, but the lower pin 37 is prevented from falling out by caulking the peripheries of the holes formed in the joint yoke 51. This structure makes it possible to form a shock-absorbing joint (Compact Noise Insulate, abbreviated to CNI).

The function of this second embodiment is substantially the same as that of the first embodiment, except that it has the advantage of providing a smoother rotational transmission. In other words, if there should be any displacement in the axial direction caused by the joint angle, the composite rubber ring 59 of the shock-absorbing ring 53 deforms in response to that axial displacement, and thus the rotation of the upper shaft 11 is transferred smoothly to the middle shaft 13.

Figure 10:
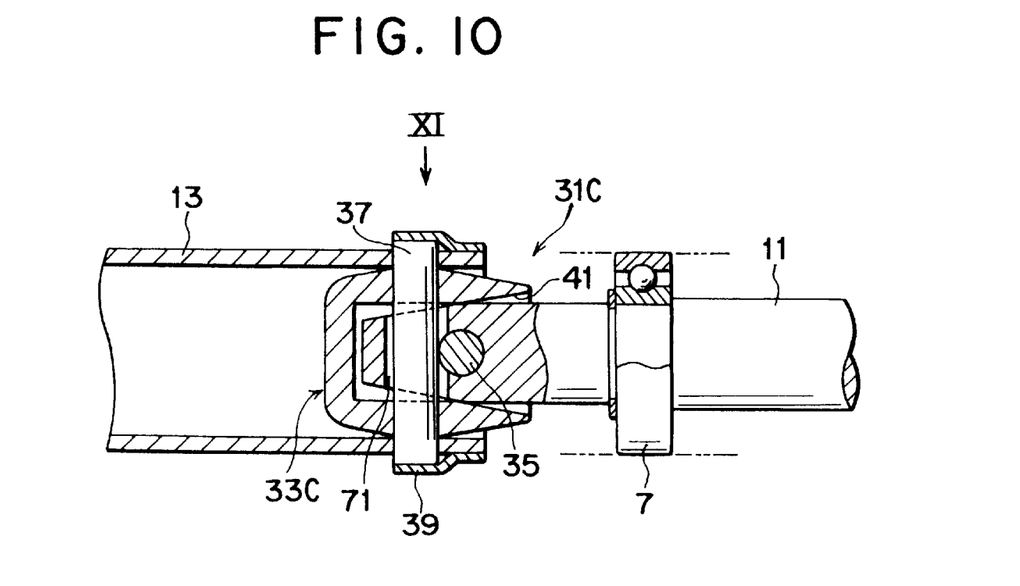
FIG. 10 is a lengthwise section through the universal joint of a third embodiment of the invention.
Figure 11:
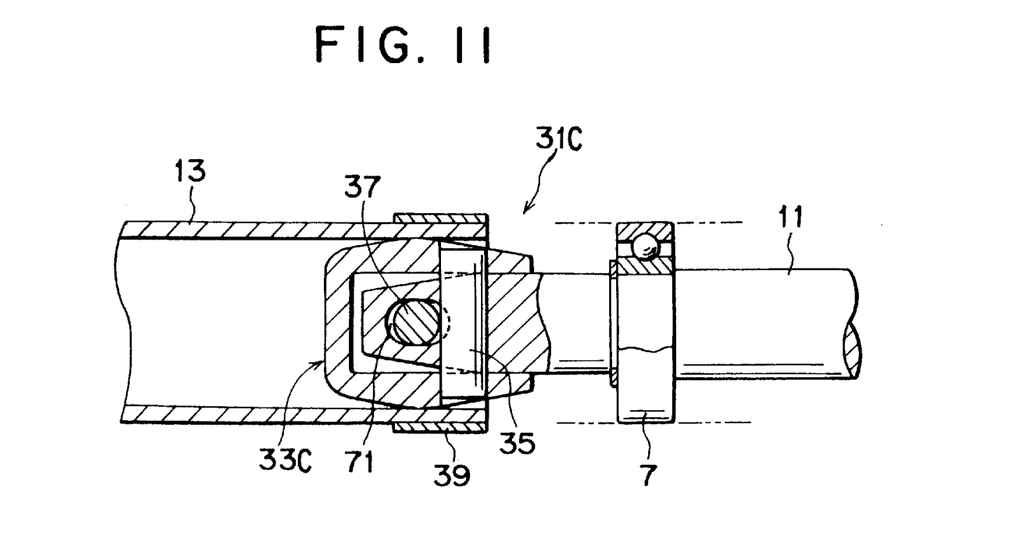
FIG. 11 is a view in the direction of the arrow XI in FIG. 10.

A third embodiment of this invention is shown in FIG. 10 and FIG. 11 (which is a view in the direction of the arrow XI in FIG. 10). The description of this third embodiment focuses on points where it differs from the first embodiment, so further description of common portions is omitted.

The universal joint 31C of this third embodiment utilizes substantially the same construction as that of the first embodiment, except that an elliptical slot 71 is formed in a front end portion of the upper shaft 11, to engage with the lower pin 37. This ensures that the lower pin 37 of the third embodiment is attached to the upper shaft 11 reliably and firmly, making it possible to transmit an even larger torque between the upper shaft 11 and the middle shaft 13.

Figure 12:
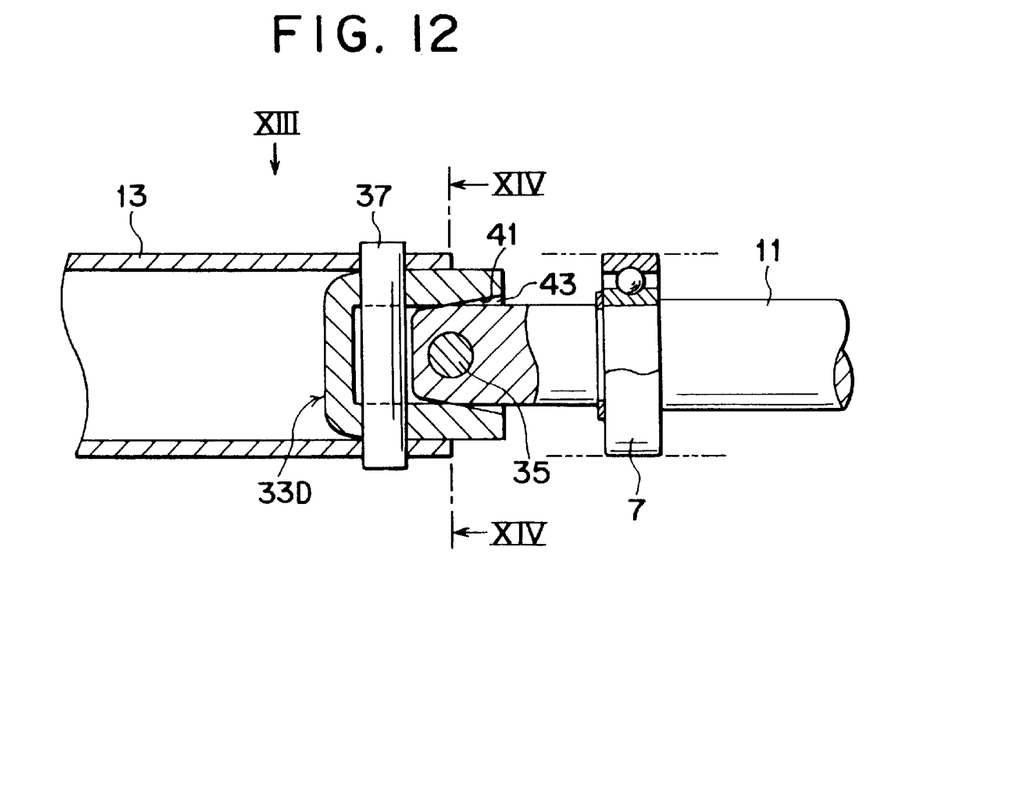
FIG. 12 is a lengthwise section through the universal joint of a fourth embodiment of the invention.
Figure 13:
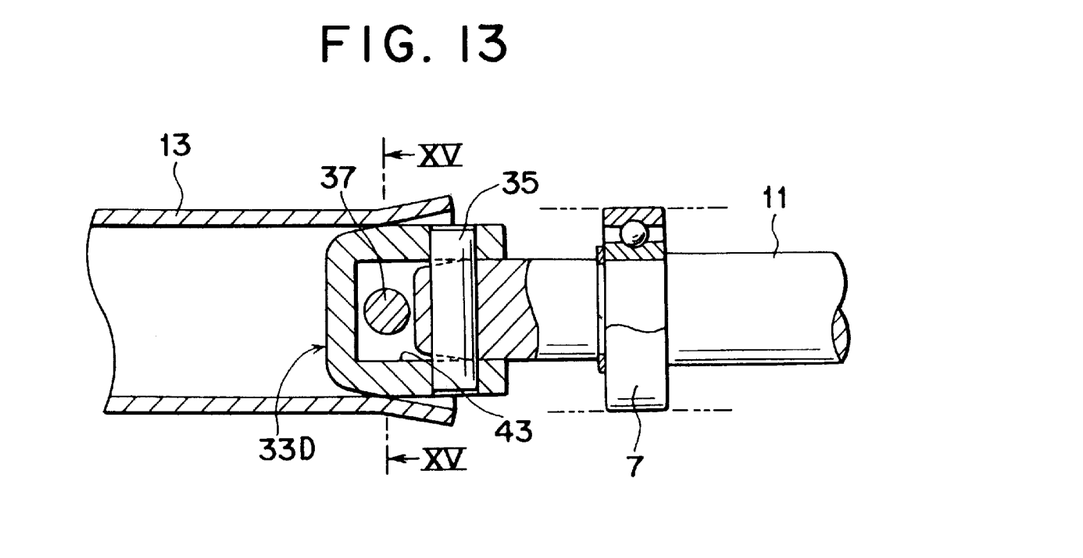
FIG. 13 is a view in the direction of the arrow XIII in FIG. 12.

A fourth embodiment of this invention is shown in FIG. 12, FIG. 13 (which is a view in the direction of the arrow XIII in FIG. 12), FIG. 14 (which is a lateral section taken along the line XIV—XIV in FIG. 12), and FIG. 15 (which is a lateral section taken along the line XV—XV in FIG. 13). The description of this fourth embodiment focuses on points where it differs from the first embodiment, so further description of common portions is omitted.

Figure 14:
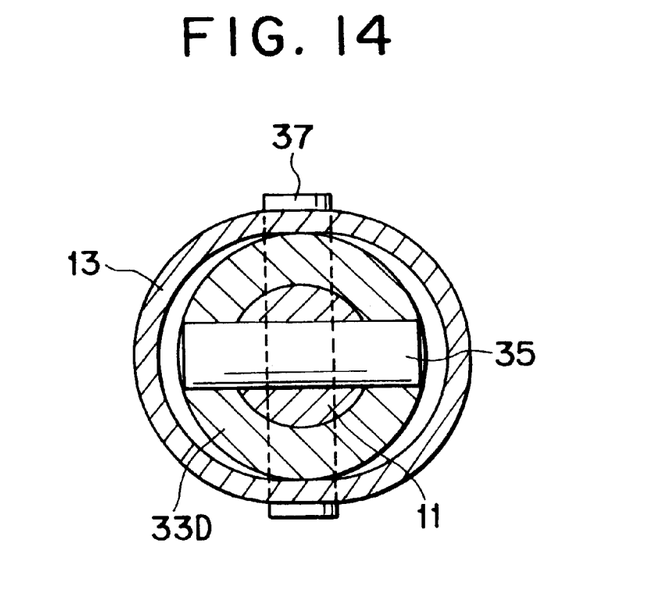
FIG. 14 is a lateral section taken along the line XIV—XIV in FIG. 12.
Figure 15:
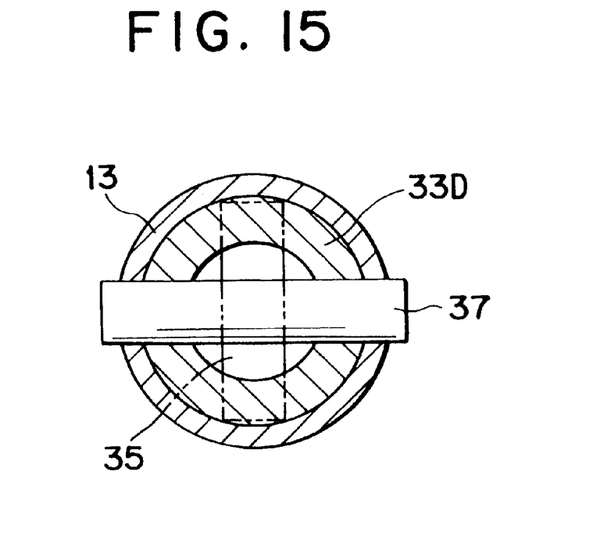
FIG. 15 is a lateral section taken along the line XV—XV in FIG. 13.

The universal joint 31D of this fourth embodiment also utilizes substantially the same construction as that of the first embodiment, except that the upper pin 35 and the lower pin 37 are held a predetermined distance apart, and no groove, slot, or the like is provided in the upper shaft 11 therein. In addition, the outer surface of the hub 33D is formed in a substantially circular cylindrical shape, whereas the aperture portion of the middle shaft 13 is formed in the shape of an ellipse, as shown in FIG. 14, so that the hub 33D can oscillate about the oscillatory center of the lower pin 37. Utilization of the above described arrangement of this fourth embodiment increases the strength of the hub 33D and also makes it possible to greatly reduce the machining costs of the various components.

Figure 16:
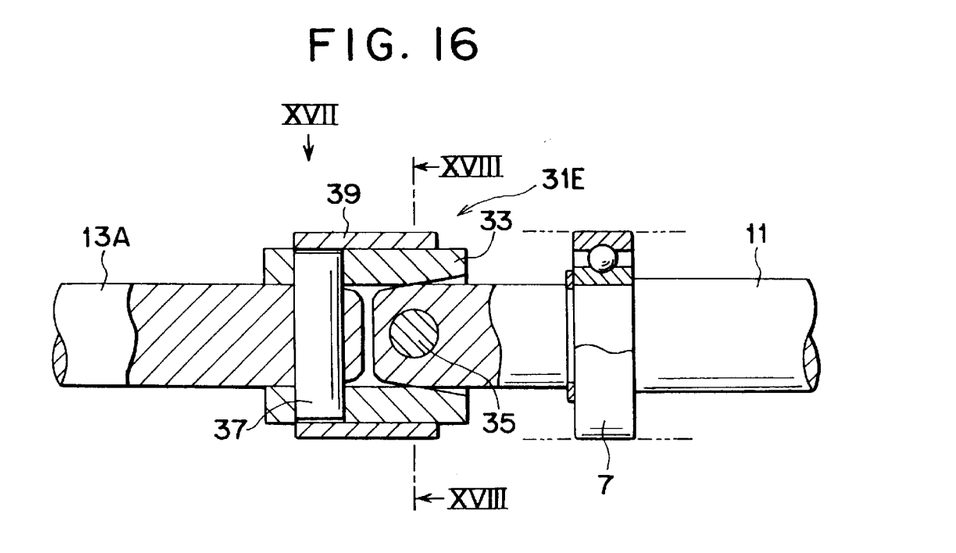
FIG. 16 is a lengthwise section through the universal joint of a fifth embodiment of the invention.
Figure 17:
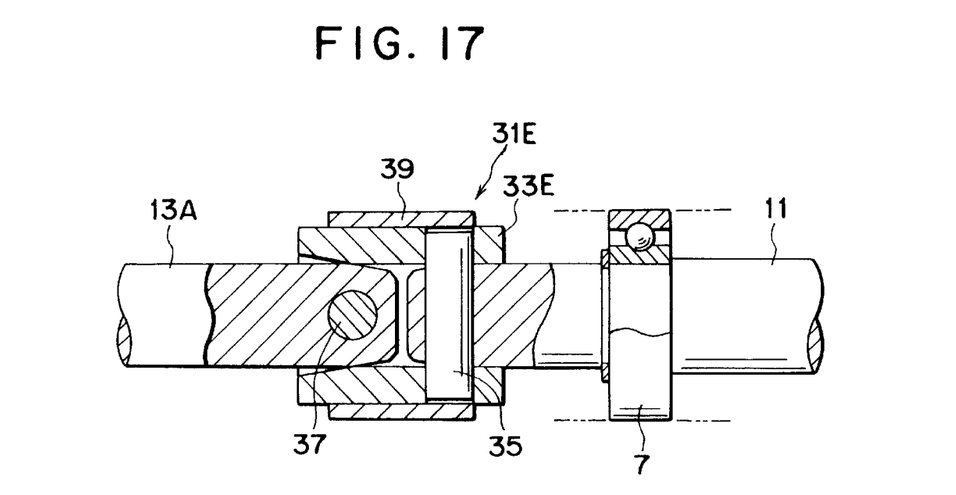
FIG. 17 is a view in the direction of the arrow XVII in FIG. 16.
Figure 18:
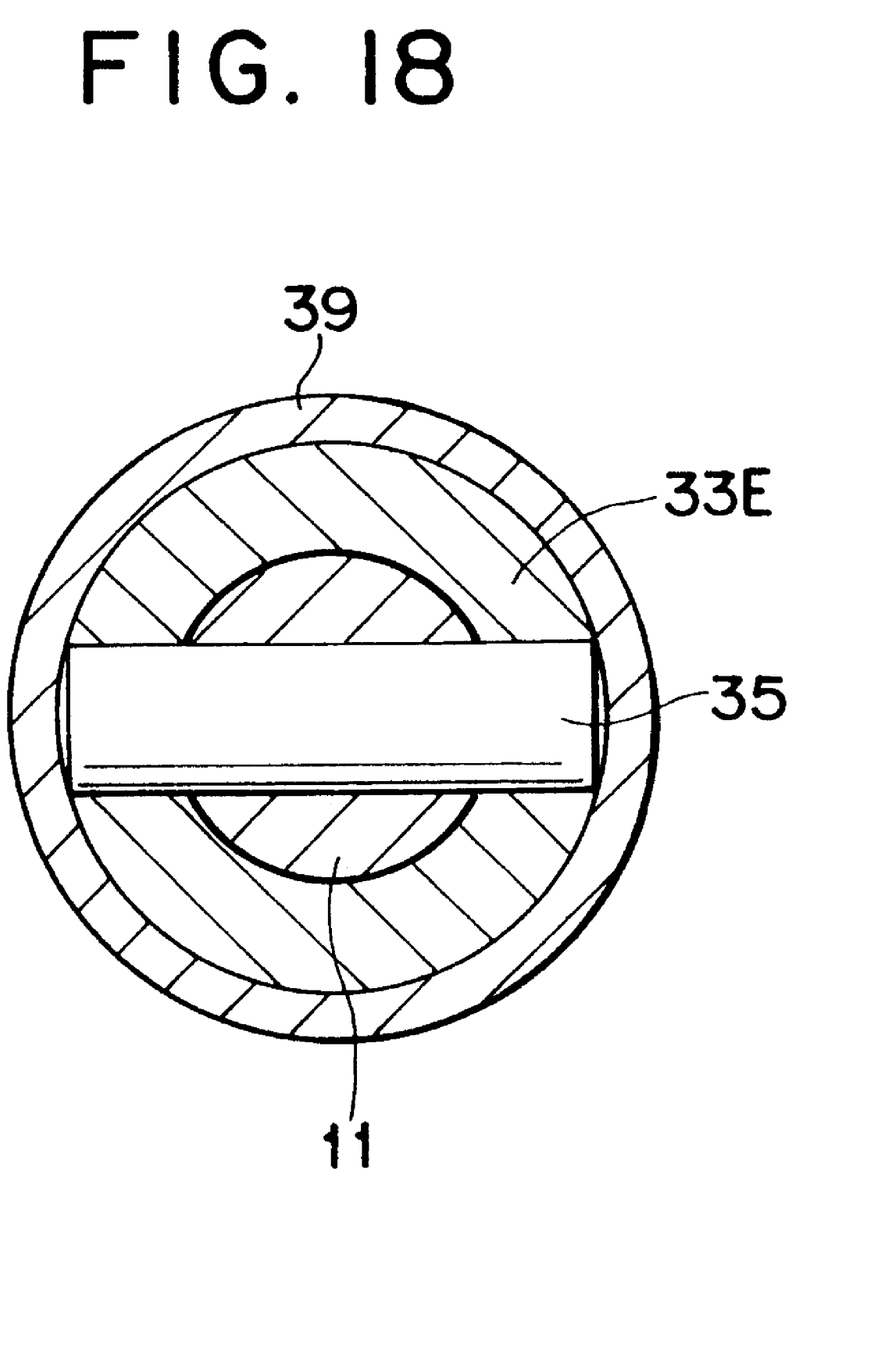
FIG. 18 is a lateral section taken along the line XVIII—XVIII in FIG. 16.

A fifth embodiment of this invention is shown in FIG. 16, FIG. 17 (which is a view in the direction of the arrow XVII in FIG. 16), and FIG. 18 (which is a lateral section taken along the line XVIII—XVIII in FIG. 16). Note that the description of this fifth embodiment also focuses on points where it differs from the first embodiment, so further description of common portions is omitted.

The universal joint 31 of this fifth embodiment utilizes substantially the same construction as that of the fourth embodiment, except that the upper pin 35 and the lower pin 37 are further apart, and also the stopper ring 39 comprising a cylindrical tube for preventing the upper pin 35 and the lower pin 37 from falling out is fitted over the outside of the hub 33E after the solid upper shaft 11 and the middle shaft 13 have been inserted into the circular cylindrical hub 33E. Utilization of the above described arrangement of this fifth embodiment makes it possible to form the end portions of the upper shaft 11 and the middle shaft 13 to the same shape and also enables a reduction in the machining costs of the hub 33E. Furthermore, if the apertures of the hub 33E are caulked to prevent the upper pin 35 and the lower pin 37 from falling out, the stopper ring 39 can be omitted, enabling a further reduction in manufacturing costs.

Figure 19:
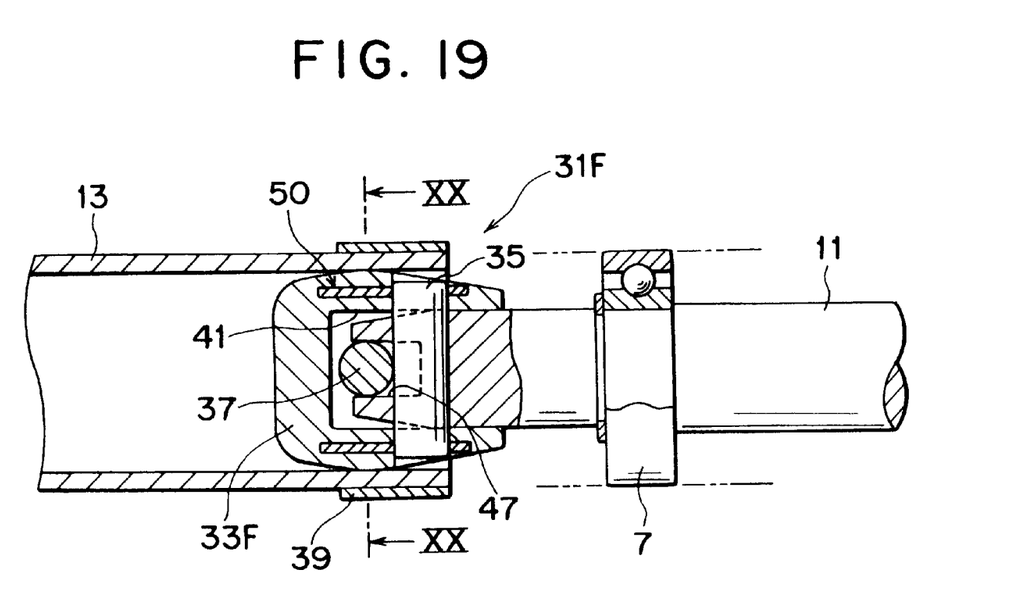
FIG. 19 is a lengthwise section through the universal joint of a sixth embodiment of the invention.
Figure 20:
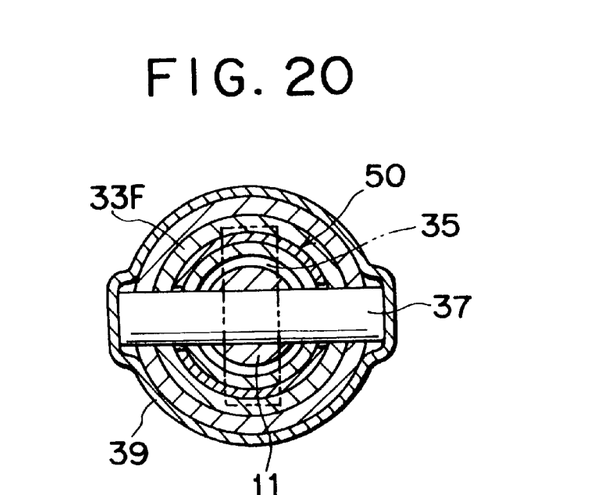
FIG. 20 is a lateral section taken along the line XX—XX in FIG. 19.

A sixth embodiment of this invention is shown in FIG. 19 and FIG. 20 (which is a lateral section taken along the line XX—XX in FIG. 19. Note that the description of this sixth embodiment also focuses on points where it differs from the first embodiment, so further description of common portions is omitted.

The universal joint 31F of this sixth embodiment utilizes substantially the same construction as that of the first embodiment, except that the hub 33F is formed of a composite resin and a circular cylindrical metal ring 50 is inserted into the center thereof by casting. The composite resin hub 33F is reinforced by this metal ring 50, to increase the mechanical strength thereof. In this case, perforations are provided in the wall surfaces of the metal ring 50 and hub 33F, through which the upper pin 35 and the lower pin 37 pass.

Figure 21:
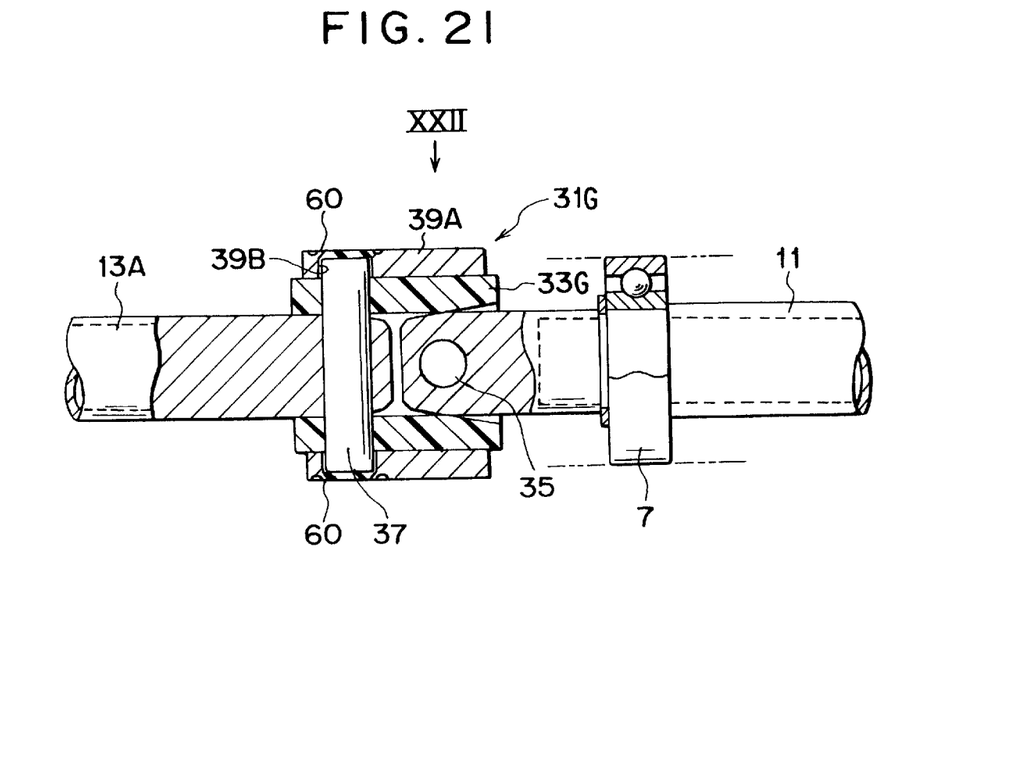
FIG. 21 is a lengthwise section through the universal joint of a seventh embodiment of the invention.
Figure 22:
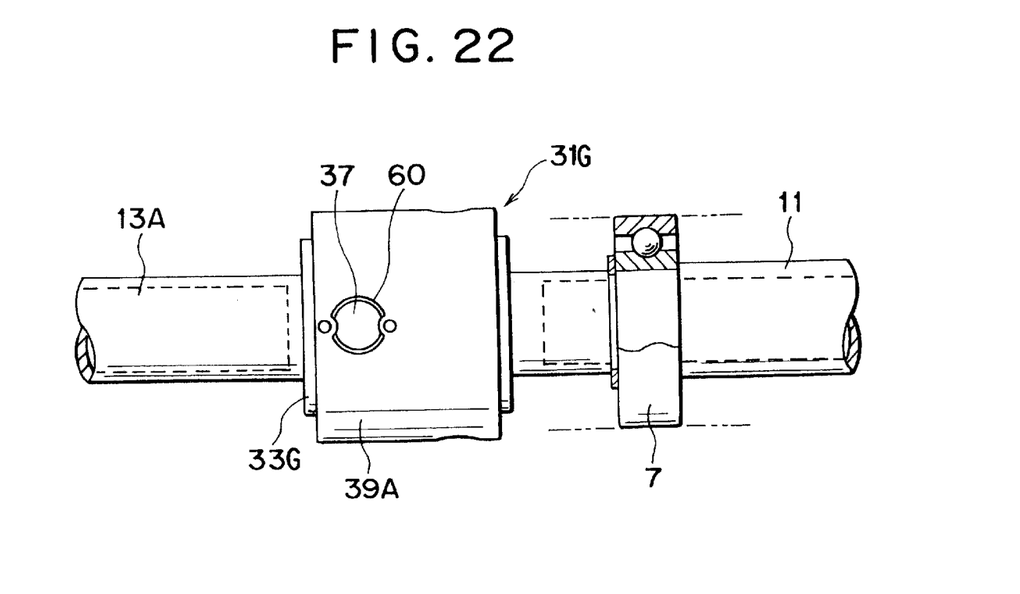
FIG. 22 is a view in the direction of the arrow XXII in FIG. 21.

A seventh embodiment of this invention is shown in FIG. 21 and FIG. 22 (which is a view in the direction of the arrow XXII in FIG. 21). Note that the description of this seventh embodiment also focuses on points where it differs from the first embodiment (see FIG. 2) and the fifth embodiment (see FIG. 16), so further description of common portions is omitted.

The universal joint 31G of this seventh embodiment utilizes substantially the same construction as that of the fifth embodiment, except that in this case a circular cylindrical tube 39A made of metal is fitted over the outside of the composite resin hub 33G, to ensure that the outer periphery thereof can bear with a large torque, the two end portions of the lower pin 37 that pass through the hub 33G are inserted loosely into perforations 39B in this tube 39A, and edge portions of the perforations 39B of the tube 39A are caulked to prevent the lower pin 37 from falling out. This configuration ensures that ordinary levels of torque are borne by the composite resin hub 33G but large torques can be borne by the metal tube 39A.

This ends the description of preferred embodiments of the present invention, but this invention should not be taken as being limited to these embodiments. For example, the first embodiment was described in such a manner that the upper pin is pressed into the upper shaft and the lower pin is pressed into the lower shaft, but the upper pin could equally well be pressed into the hub and the lower pin into the middle shaft. Similarly, if play in the rotational direction of the upper shaft and the middle shaft is permitted, the upper and the lower pins need not be press-fitted. The specific shape of the hub and the specific configuration of the universal joint can be varied as appropriate, within the scope of this invention. Furthermore, the solid upper shaft could be made hollow (as shown in FIG. 21) without deviating from the scope of the present invention.

As mentioned previously, the universal joint in accordance with this invention relates to a universal joint that couples together a first shaft and a second shaft in a freely oscillatory manner relative to one another; wherein the universal joint comprises a hub into which or onto which are fitted the first shaft and the second shaft in such a manner that these shafts are free to oscillate mutually in respective predetermined directions; a first pin coupling together the first shaft and the hub at the center of oscillation of the first shaft; and a second pin coupling together the hub and the second shaft at the center of oscillation of the second shaft, at a predetermined offset with respect to the first pin in the axial direction of the hub and also maintaining a phase angle difference of approximately 90 degrees with the first pin. There is therefore no need for components that require complicated machining, such as joint yokes and a crosspiece, and also the number of components and the number of assembly steps can be reduced, thus realizing a huge reduction in manufacturing cost and an improved mass-productivity.

What is claimed is:

1. A universal joint assembly coupling together a first shaft and a second shaft in a freely oscillatory manner relative to one another, wherein said universal joint assembly comprises:
   a hub into which is fitted said first shaft and onto which is fitted an inner peripheral surface of said second shaft in such a manner that said shafts are free to oscillate mutually in respective predetermined directions;
   a first pin coupling together said first shaft and said hub at the center of oscillation of said first shaft; and a second pin coupling together said second shaft and said hub at the center of oscillation of said second shaft, at a predetermined offset with respect to said first pin in the axial direction of said hub and also maintaining a predetermined phase angle difference with said first pin.

2. The universal joint assembly of claim 1, wherein a concavity is formed in a front end portion of said first shaft, for accommodating said second pin in a freely oscillatory manner.

3. The universal joint assembly of claim 1, wherein said first shaft is a thermally hardened shaft.

4. The universal joint assembly of claim 1, wherein said hub is formed of a composite resin.

5. The universal joint assembly of claim 4, wherein a cylindrical metal ring is inserted into a substantially central portion of said hub.

6. The universal joint assembly of claim 1, wherein an elliptical slot is formed in a front end portion of said first shaft, for engaging with said second pin.

7. The universal joint assembly of claim 1, wherein said second shaft is formed of a hollow body and said hub is inserted into said second shaft.

8. The universal joint assembly of claim 1, wherein a stopper ring is fit over an outside of said second shaft, to thereby prevent said second pin from falling out.

9. A universal joint assembly coupling together a solid shaft and a hollow shaft in a freely oscillatory manner relative to one another, wherein said universal joint assembly comprises:
   a hub into which is fitted said solid shaft and onto which is fitted an inner peripheral surface of said hollow shaft in such a manner that said shafts are free to oscillate mutually in respective predetermined directions;
   a first pin coupling together said solid shaft and said hub at the center of oscillation of said solid shaft;
   a second pin coupling together said hollow shaft and said hub at the center of oscillation of said hollow shaft, at a predetermined offset with respect to said first pin in the axial direction of said hub and also maintaining any desired phase angle difference with said first pin; and
   a circular cylindrical tube fitted over the outside of said hub, to thereby prevent said first pin and said second pin from falling out.

10. The universal joint assembly of claim 9, wherein said circular cylindrical tube is constructed of metal, in such a manner as to bear a large torque.

11. The universal joint assembly of claim 9, wherein edges of through holes for said first pin and said second pin in said circular cylindrical tube are caulked, to thereby prevent said pins from falling out and the cylindrical tube is metallic.

12. A universal joint assembly coupling together a first shaft and a second shaft in a freely oscillatory manner relative to one another, wherein said universal joint assembly comprises:
   a hub into which or onto which are fitted said first shaft and said second shaft in such a manner that said shafts are free to oscillate mutually in respective predetermined directions, the hub formed from composite resin having a cylindrical metal ring inserted into a substantially central portion of the hub;
   a first pin coupling together said first shaft and said hub at the center of oscillation of said first shaft; and
   a second pin coupling together said second shaft and said hub at the center of oscillation of said second shaft, at a predetermined offset with respect to said first pin in the axial direction of said hub and also maintaining a predetermined phase angle difference with said first pin.

13. A universal joint assembly coupling together a first shaft and a second shaft in a freely oscillatory manner relative to one another, wherein said universal joint assembly comprises:
   a hub into which or onto which are fitted said first shaft and said second shaft in such a manner that said shafts are free to oscillate mutually in respective predetermined directions;
   a first pin coupling together said first shaft and said hub at the center of oscillation of said first shaft; and
   a second pin coupling together said second shaft and said hub at the center of oscillation of said second shaft, at a predetermined offset with respect to said first pin in the axial direction of said hub and also maintaining a predetermined phase angle difference with said first pin;
   wherein an elliptical slot is formed in a front end portion of said first shaft for engaging with said second pin.

14. A universal joint assembly coupling together a first hollow shaft and a second hollow shaft in a freely oscillatory manner relative to one another, wherein said universal joint assembly comprises:
   a hub into which are fitted said first hollow shaft and said second hollow shaft in such a manner that said hollow shafts are free to oscillate mutually in respective predetermined directions;
   a first pin coupling together said first hollow shaft and said hub at the center of oscillation of said first hollow shaft;
   a second pin coupling together said second hollow shaft and said hub at the center of oscillation of said second hollow shaft, at a predetermined offset with respect to said first pin in the axial direction of said hub and also maintaining any desired phase angle difference with said first pin; and
   a circular cylindrical tube fitted over the outside of said hub, to thereby prevent said first pin and said second pin from falling out;
   wherein edges of through holes for said first pin and said second pin in said circular cylindrical tube are caulked to prevent said pins from falling out, the circular cylindrical tube being metallic.

* * * * *